(12) United States Patent
Sennebogen

(10) Patent No.: US 12,310,296 B2
(45) Date of Patent: May 27, 2025

(54) ARTICULATED BOOM, MACHINE, METHOD FOR MANUFACTURING A CONNECTING PIECE FOR AN ARTICULATED BOOM AND USE OF AN ARTICULATED BOOM

(71) Applicant: Sennebogen Maschinenfabrik GmbH, Straubing (DE)

(72) Inventor: Erich Sennebogen, Straubing (DE)

(73) Assignee: SENNEBOGEN MASCHINENFABRIK GMBH, Straubing (DE)

( * ) Notice: Subject to any disclaimer, the term of this patent is extended or adjusted under 35 U.S.C. 154(b) by 767 days.

(21) Appl. No.: 17/410,738

(22) Filed: Aug. 24, 2021

(65) Prior Publication Data

US 2023/0060491 A1    Mar. 2, 2023

(51) Int. Cl.
| | | |
|---|---|---|
| *A01G 23/08* | (2006.01) | |
| *B29C 41/02* | (2006.01) | |
| *B29C 41/42* | (2006.01) | |
| *B29C 70/30* | (2006.01) | |
| *B66C 23/64* | (2006.01) | |
| *B25J 18/02* | (2006.01) | |
| *B29K 105/12* | (2006.01) | |

(52) U.S. Cl.
CPC ............. *A01G 23/08* (2013.01); *B29C 41/02* (2013.01); *B29C 41/42* (2013.01); *B29C 70/30* (2013.01); *B66C 23/64* (2013.01); *B25J 18/02* (2013.01); *B29K 2105/12* (2013.01)

(58) Field of Classification Search
CPC ........... A01G 23/08; B25J 18/02; B66C 23/64
See application file for complete search history.

(56) References Cited

U.S. PATENT DOCUMENTS

| | | | | |
|---|---|---|---|---|
| 6,719,009 | B1* | 4/2004 | Bissen | E04G 21/0436 138/140 |
| 6,755,212 | B1* | 6/2004 | Anderson | F16L 57/06 428/36.1 |
| 6,786,233 | B1* | 9/2004 | Anderson | F16L 3/015 141/387 |
| 2017/0022106 | A1* | 1/2017 | Buttner | C04B 28/12 |
| 2017/0022703 | A1* | 1/2017 | Buttner | E04C 2/46 |

(Continued)

FOREIGN PATENT DOCUMENTS

| | | |
|---|---|---|
| CN | 112081382 A | 12/2020 |
| CN | 113123399 A | 7/2021 |
| EP | 3656208 A1 | 5/2020 |

(Continued)

OTHER PUBLICATIONS

KR 100559237 B1 Machine Translation (Year: 2006).*
(Continued)

*Primary Examiner* — Emmanuel M Marcelo
*Assistant Examiner* — Juan J Campos, Jr.
(74) *Attorney, Agent, or Firm* — Quarles & Brady LLP

(57) ABSTRACT

An articulated boom having two limbs, wherein at least one of the limbs includes a first section, a second section and an electrically insulating connecting piece which connects the first section to the second section and which is rigidly connected to the first section and to the second section. The connecting piece includes glass fibers which are cast with a plastic matrix.

13 Claims, 12 Drawing Sheets

(56) References Cited

U.S. PATENT DOCUMENTS

Figure 1:
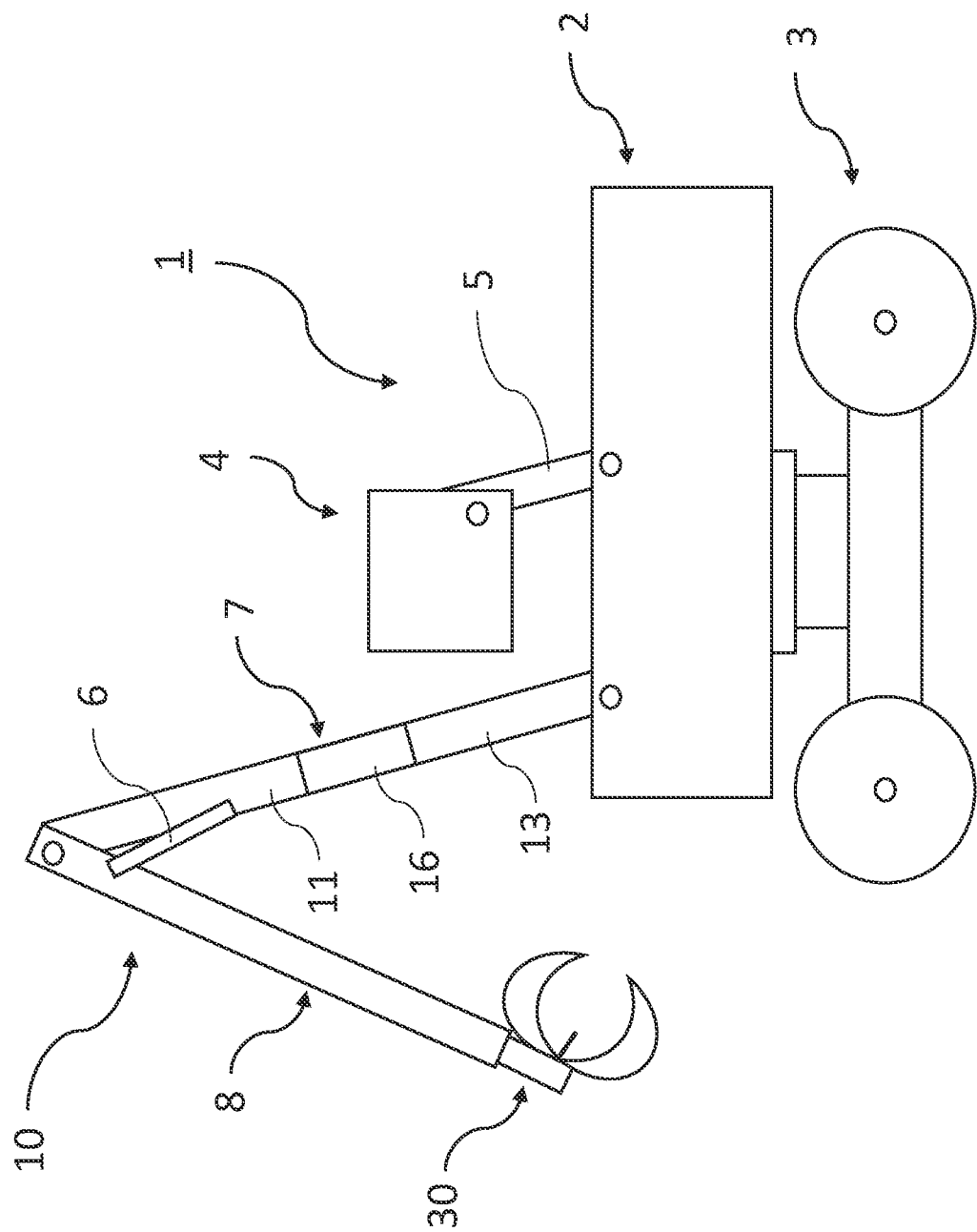

2019/0098846 A1\* 4/2019 Murphy ................. B32B 5/024
2019/0098888 A1\* 4/2019 Murphy ................ B05B 15/656

FOREIGN PATENT DOCUMENTS

| FR | 2580777 A1 | 10/1986 |
| KR | 100559237 B1 | 5/2006 |
| WO | 2012156808 A1 | 11/2012 |
| WO | 2019123145 A1 | 6/2019 |

OTHER PUBLICATIONS

EP 3656208 A1 Machine Translation. (Year: 2020).\*
European Patent Office, Extended Search Report, Application No. 22185835, filed Jan. 30, 2023, 8 pages [English Language Translation Unavailable].
European Patent Office, Extended Search Report, Application No. 23197587.1, Jan. 31, 2024, 7 pages [English Language Translation Unavailable].

\* cited by examiner

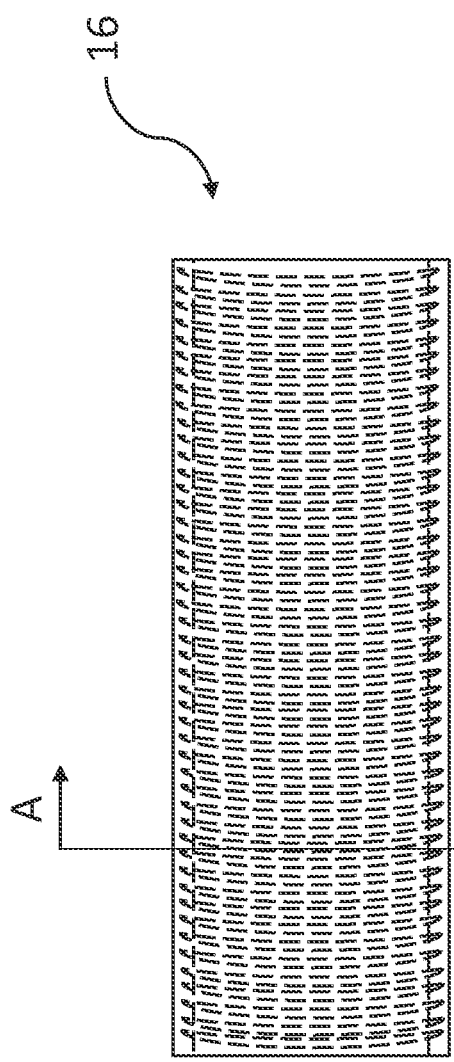
Fig. 4
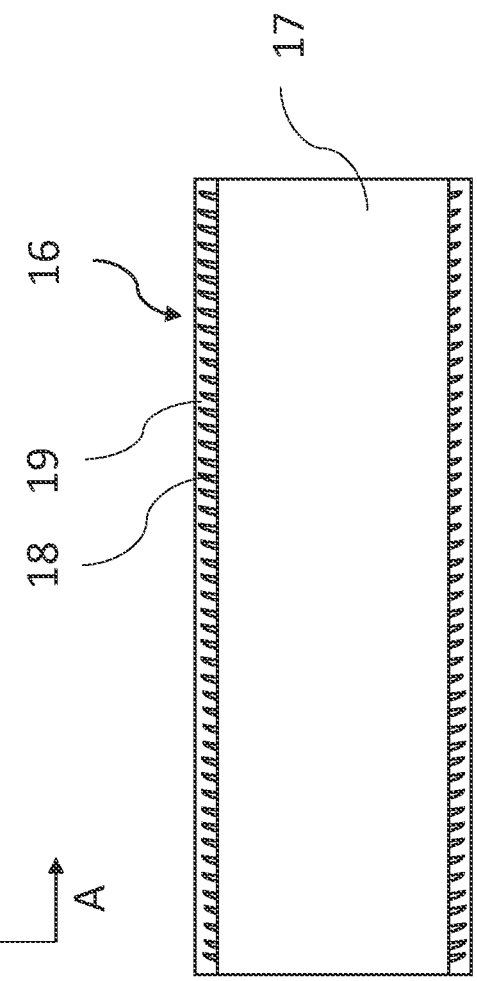
Fig. 5
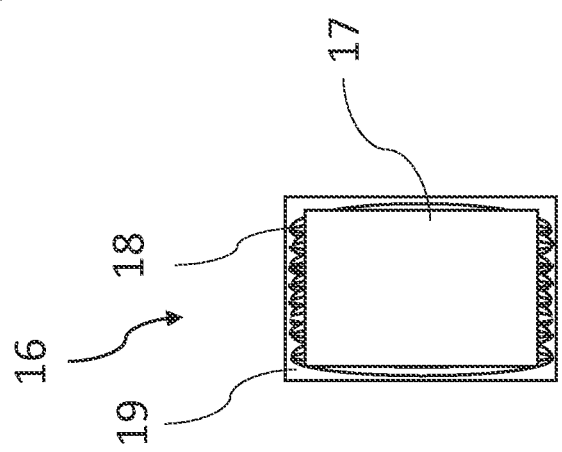
A-A  Fig. 6

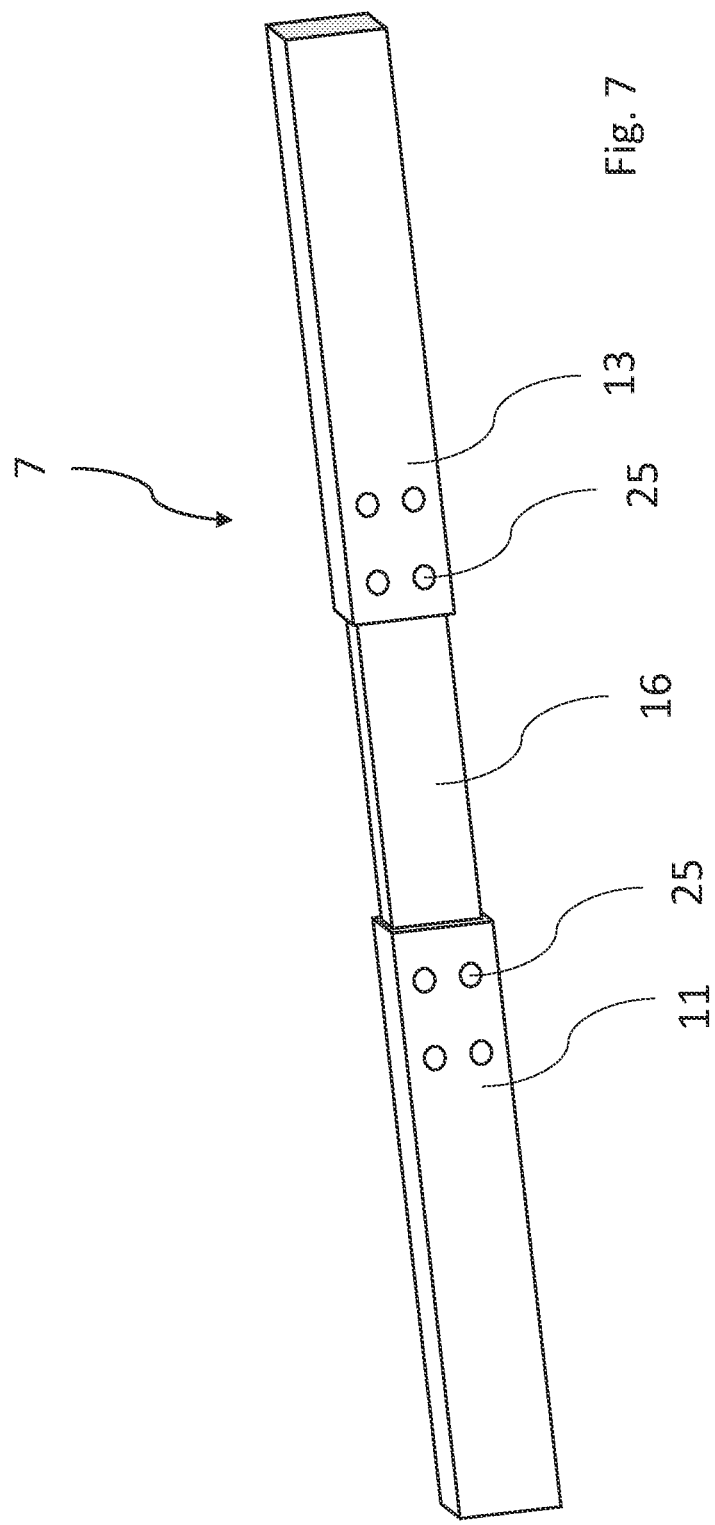

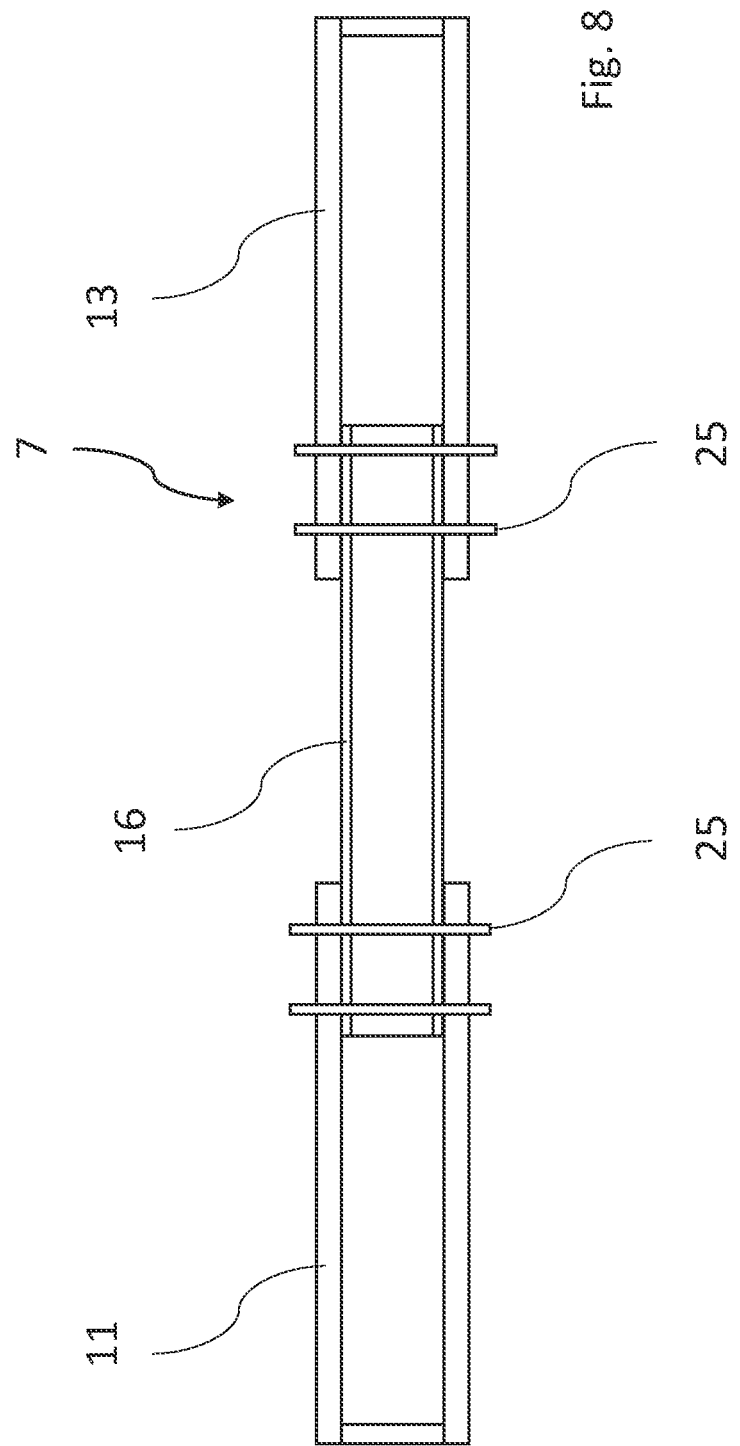

B-B

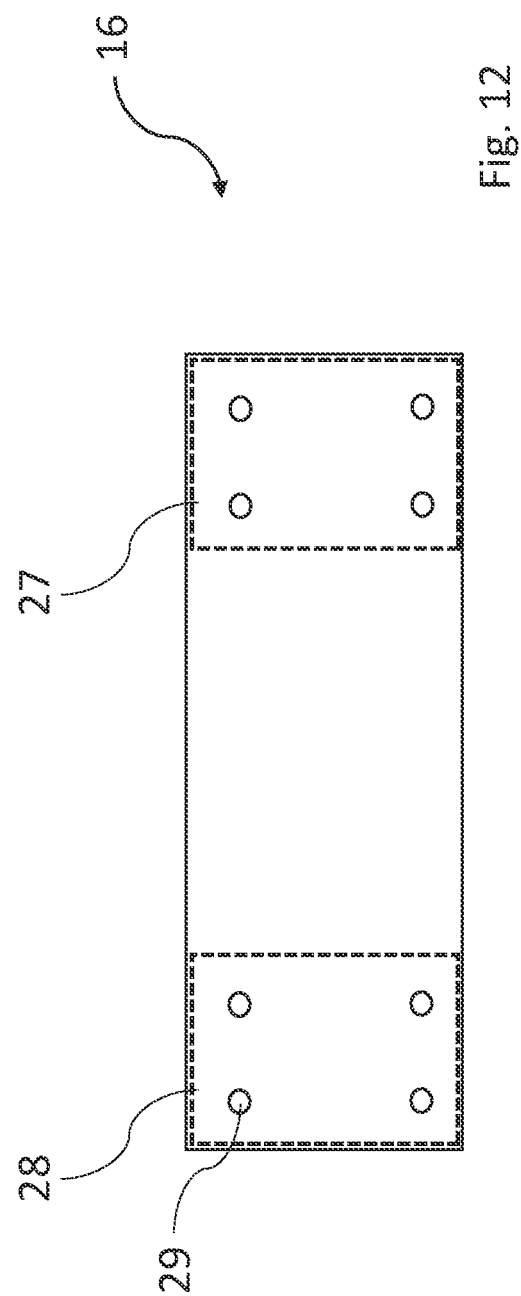

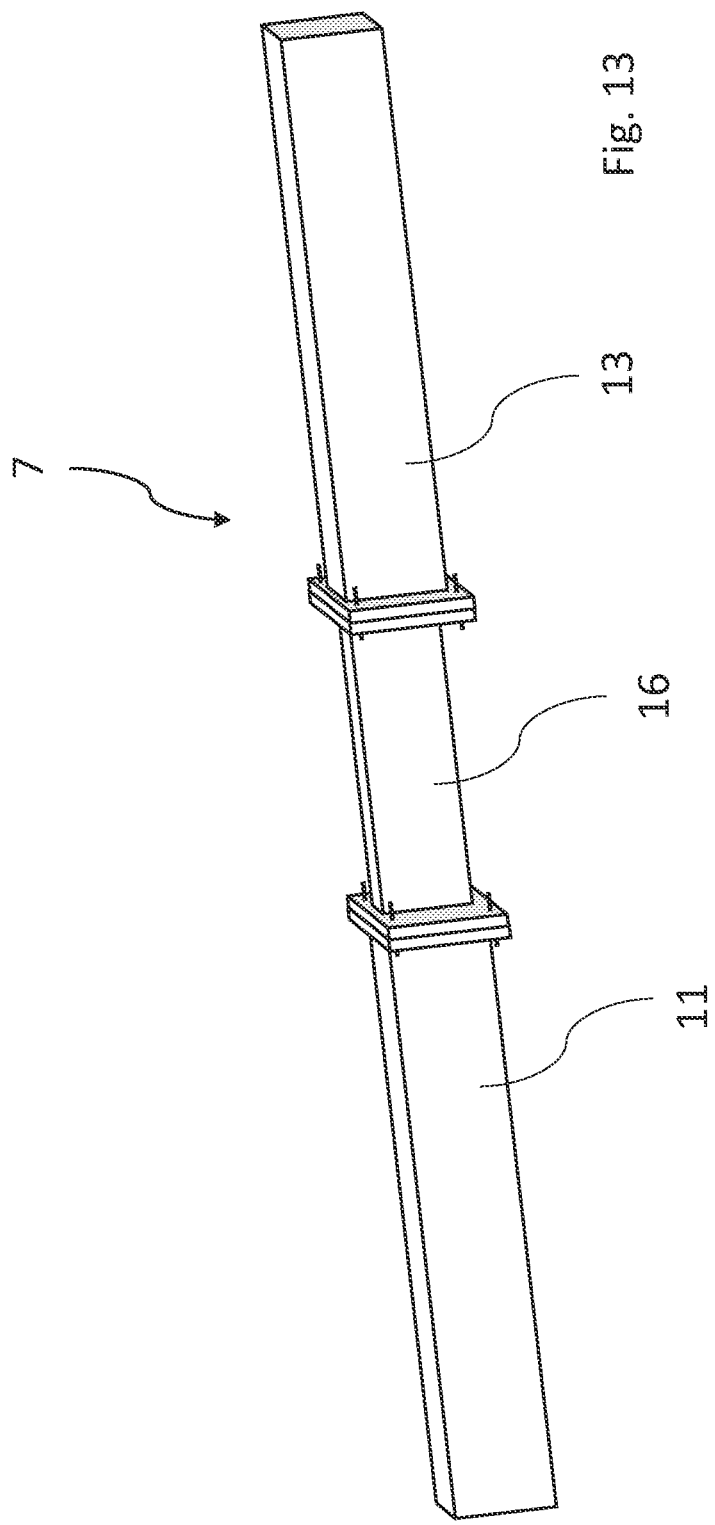

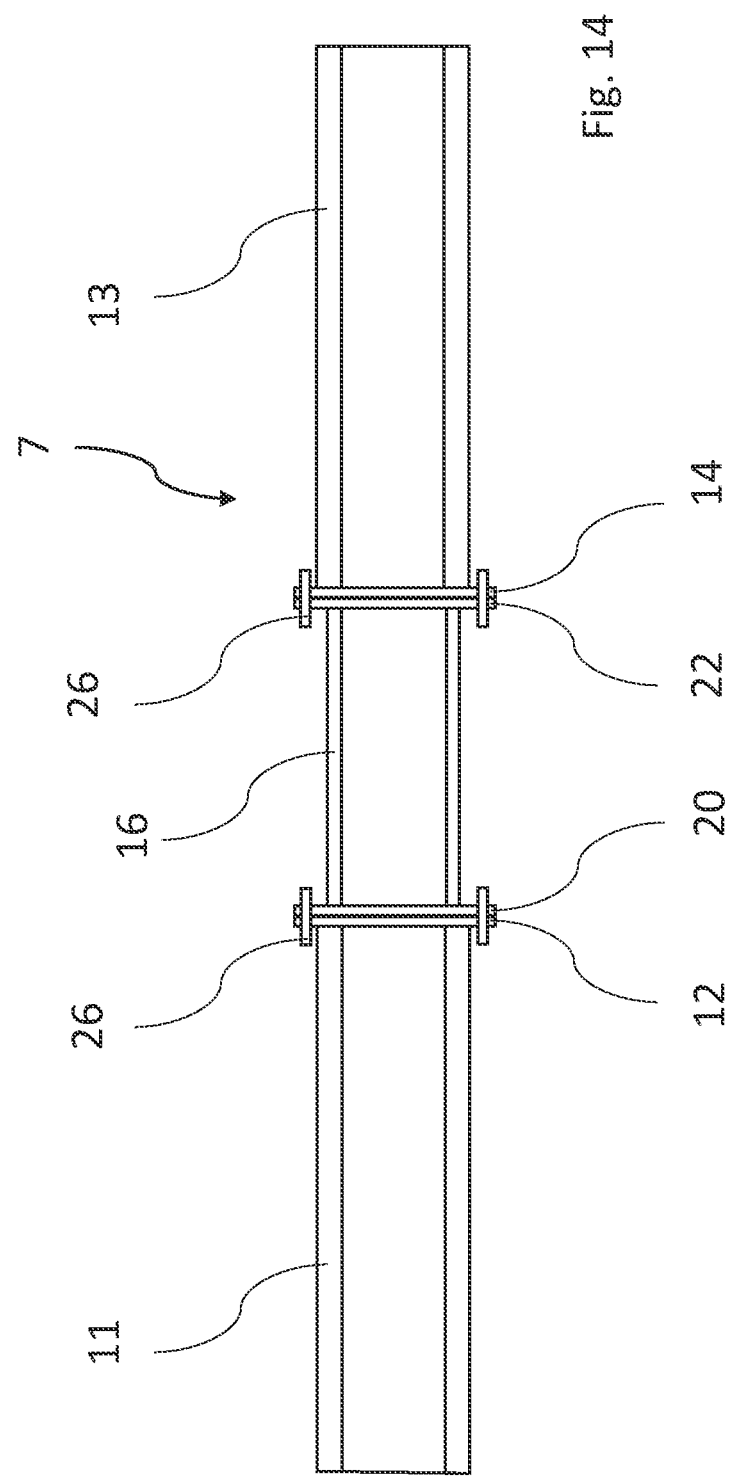

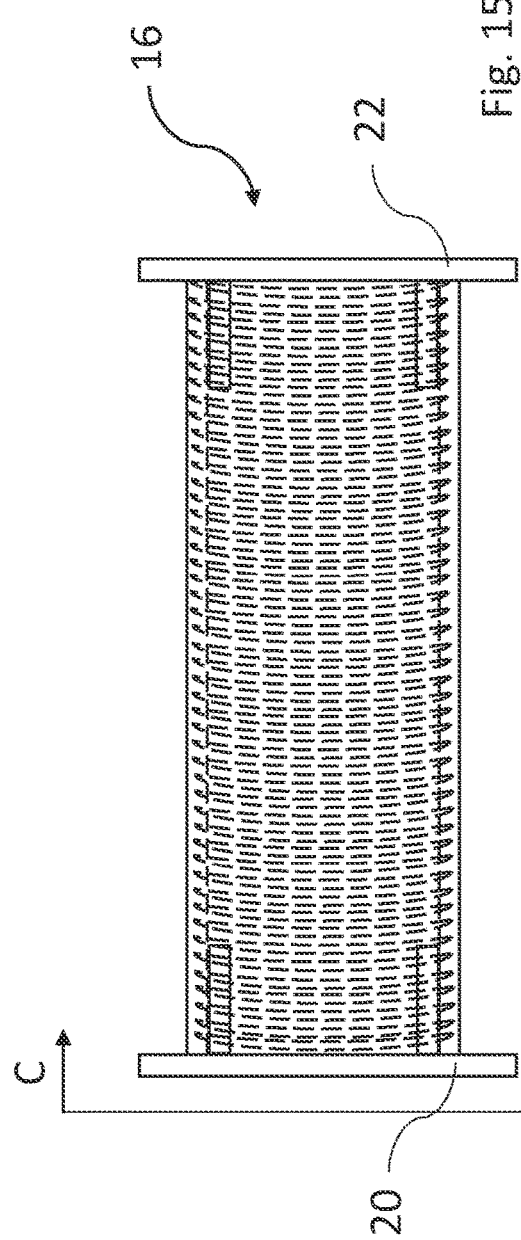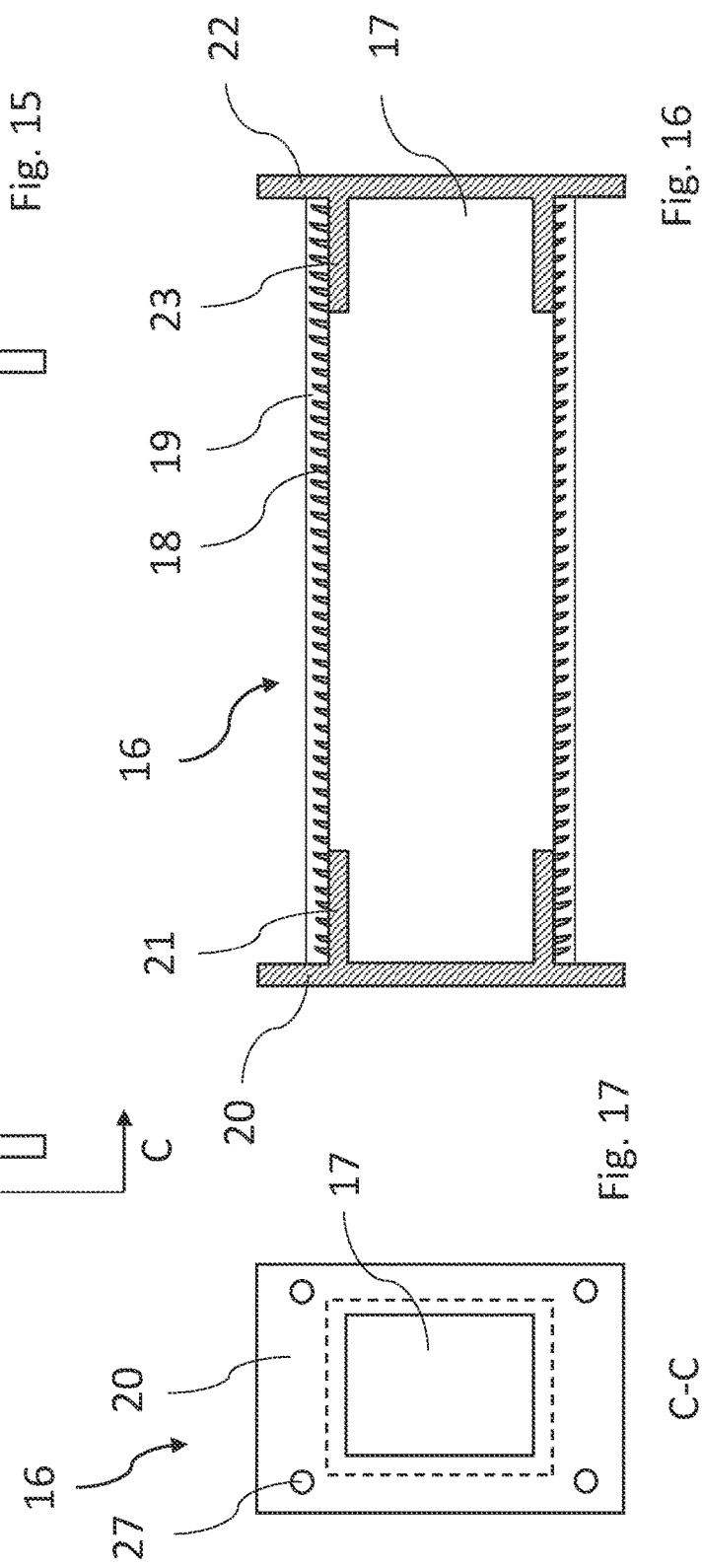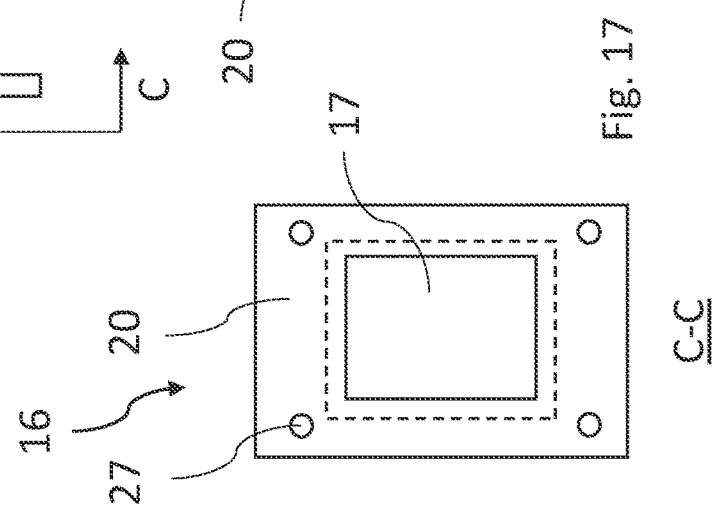

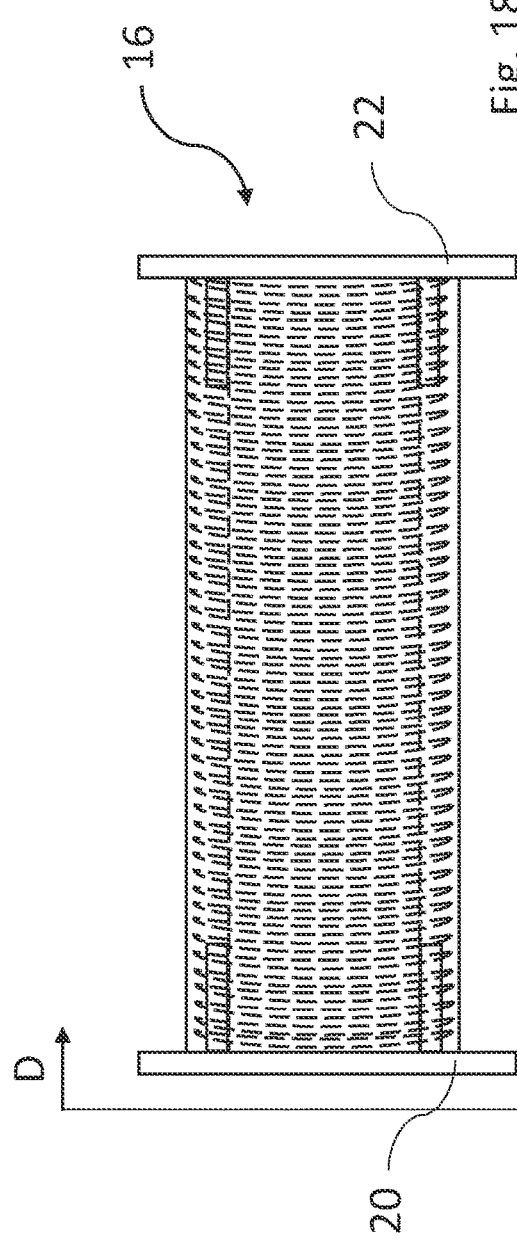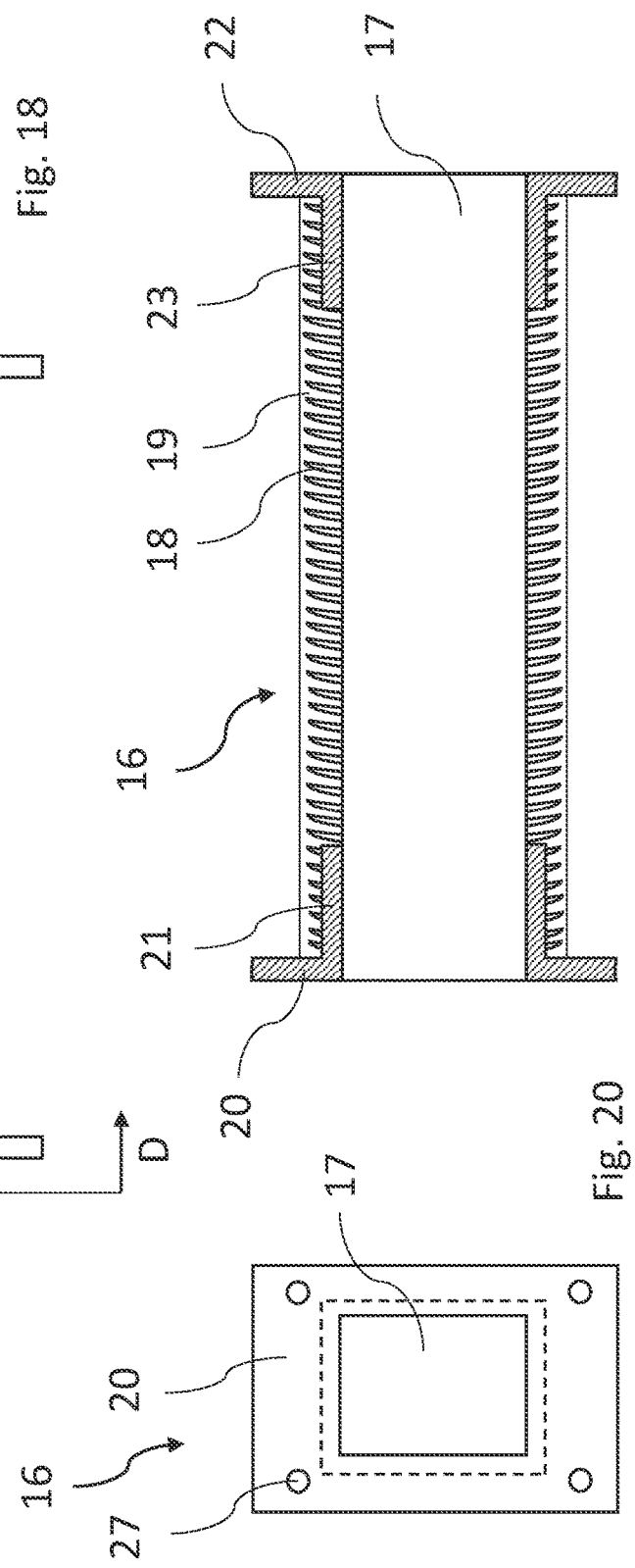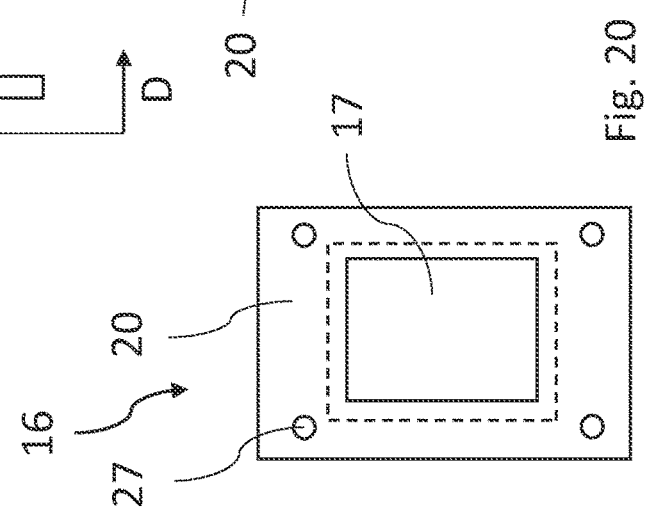

ARTICULATED BOOM, MACHINE, METHOD FOR MANUFACTURING A CONNECTING PIECE FOR AN ARTICULATED BOOM AND USE OF AN ARTICULATED BOOM

The disclosure relates to an articulated boom, in particular for a machine. Furthermore, the disclosure relates to a machine, in particular a forest harvester, comprising an articulated boom. Furthermore, the disclosure relates to methods for manufacturing a connecting piece for an articulated beam. Moreover, the disclosure relates to a use of an articulated boom for a machine.

Articulated booms are known from practice and are used with cranes, excavators, material transfer machines or the like, for example.

The disadvantage of the known machines is that if works are carried out near power lines or high-voltage power lines, a power supply of the power lines has to be cut so as not to put the workforce operating the machine in danger if the articulated boom of the machine touched the power lines.

Hence, the object of the disclosure is to provide an articulated boom with which works with a machine near power lines or high-voltage power lines are made possible without putting the workforce operating the machine in danger and without damaging the machine.

In accordance with the disclosure, this object can be attained by an articulated boom having two limbs, wherein at least one of the limbs comprises a first section, a second section and an electrically insulating connecting piece which connects the first section to the second section and which is rigidly connected to the first section and to the second section, said connecting piece comprising glass fibers which are cast with a plastic matrix. Furthermore, the articulated boom can be provided in a forest harvester. Moreover, the articulated boom can be manufactured by wrapping a core with glass fibers and casting the glass fibers with a plastic matrix. The articulated boom can also be manufactured by placing a flange on each end of a core, said flanges including webs wrapping the core and the webs with glass fibers and casting the glass fibers with a plastic matrix.

This means that an articulated boom is proposed, in particular for a machine, wherein said articulated boom comprises at least two limbs, wherein at least one of the limbs comprises a first section, a second section and an electrically insulating connecting piece which connects the first section to the second section. The connecting piece is rigidly connected to the first section and to the second section. The connecting piece comprises glass fibers, said glass fibers being cast with a plastic matrix. In other words, the glass fibers which are cast with the plastic matrix form a glass-fiber reinforced plastic (GRP).

By providing the above-described electrically insulating connecting piece, it is possible to allow for works near power lines or high-voltage power lines without cutting the power supply, but without putting the workforce operating the machine in danger and without damaging the machine.

The first section can be understood to be a first limb section. The first section is preferably made from metal, in particular steel. The second section can be understood to be a second limb section. The second section is preferably made from metal, in particular steel. The connecting piece can be understood to be an insulator or as another limb section.

A first limb is preferably disposed at a superstructure of a machine so as to be rotatable. A second limb is preferably disposed at the first limb so as to be rotatable. The first limb, the second limb or both limbs particularly preferably has/have the connecting piece.

The connecting piece preferably comprises a core which is wrapped by the glass fibers. The core is preferably enveloped or wrapped by the glass fibers or the glass-fiber reinforced plastics on its shell.

The core preferably consists of foam glass or the like. Additionally, the core preferably has a gross density in the range of 100 to 165 kg/m$^3$. As an alternative, the core can consists of panels which are glued together, wherein said panels can be made of foam glass.

Glass-fiber reinforced plastics are fiber plastics composites consisting of a plastic material and glass fibers. The base of the glass-fiber reinforced plastics can be thermosetting plastics, thermoplastics and/or elastomers. Polyester resins, epoxy resins or the like can be used as the thermosetting plastics. Polyamide or the like can be used as the thermoplastics, for example.

In the case of the glass-fiber reinforced plastics, fibers which have the required strength are preferably bonded to a plastic matrix which serves a carrier for the fibers. Glass-fiber reinforced plastics have very good electrical insulating properties and also a high corrosion resistance. The glass fibers preferably have a high resistivity which can range between $10^{14}$ and $10^{15}$ $\Omega\text{mm}^2/\text{m}$. This is why the glass fibers are particularly suited for electrical insulation. The electrically insulating connecting piece can preferably absorb/discharge alternating voltages in the range of up to 1000 KV.

Glass-fiber reinforced plastics moreover have an excellent corrosion performance, even in aggressive environments and are therefore suitable as the ideal material. Additionally, they have a high chemical resistance and a good dimensional stability.

The glass fibers are preferably produced by drawing glass threads. Here, glass is initially melted and conducted through spinning nozzles. The viscous glass threads are subsequently drawn to glass fibers. The glass fiber is the only isotropic reinforcing fiber. This means that the material properties do not depend on directions. Advantages of glass fibers are the high longitudinal tensile strength and longitudinal compressive strength, the high elongation at break and the very good thermal and electrical insulation. Furthermore, they are low-priced and easy to process.

The matrix in the fiber matrix system preferably fulfills both fiber-protecting and force-transducing functions such as fixing the fibers, forming the component and resistance against thrust folding of the fibers under compressive stress. Moreover, the fiber protects against environmental influences and friction between the fibers. Furthermore, the matrix assumes the force distribution between the fibers and UD layers, the force absorption under stress in the transverse direction of the fibers and the absorption of thrust. Furthermore, it acts as a crack arrester in a viscous matrix system. The strength parameters of the matrix material are much lower as compared to the fiber material. As it has been mentioned before already, polymeric matrix systems such as thermosetting materials, thermoplastics and elastomers are particularly convenient.

A wall thickness of the glass fibers which are cast with the plastic matrix in the range between 20 mm to 50 mm is particularly preferable. In this area, alternating voltages in the range of up to 1000 KV could be absorbed/discharged in tests.

In a preferred embodiment of the articulated boom, the connecting piece includes a first and a second end region, said first end region partially being introduced into the first section and said second end region partially being introduced into the second section. Both sections are realized to accommodate the end regions of the connecting piece. This makes it possible to insert the connecting piece precisely into the two sections.

The end regions of the connecting piece which are introduced into the first section and into the second section respectively are preferably glued to the first section and to the second section respectively. In other words, the connecting piece is slid into the sections from both sides and subsequently, the surfaces of the inlay and the sections are glued together. Furthermore, mounting is easy to realize using the glued connection.

Two part adhesives on an acrylate or epoxy resin base are for example suitable for connecting the electrically insulating connecting piece to metals, aluminum, stainless steel or steel. Other glues are conceivable. In contrast to screws, the forces are not introduced into the component on specific points, but over the entire surface without damaging the fiber reinforcement.

In another preferred embodiment of the articulated boom, the end regions of the connecting piece which are introduced into the first section and into the second section respectively are connected to the first section and to the second section using connecting means.

A connection is preferably established by means of screws, a screwed connection, in particular a screw and nut connection and by means of threaded bars or bolts. Here, the connecting piece is inserted into the two sections from both sides, as described above, and the two section ends are screwed to the inlay. An advantage of this type of attachment is the compactness of the structure. Nonetheless, the dimensions of the limb do not have to change. Steel cores having an internal thread can preferably be inserted into the connecting piece in the case of screw connections.

Reinforcing plates or sheets are particularly preferably disposed on the ends of the connecting piece or in the connecting piece. In this case, the reinforcing plates or sheets can be placed on the glass fibers which are cast by means of the plastic matrix or they can be placed on the core of the connecting piece before it is wrapped by the glass fibers.

In another preferred alternative embodiment of the articulated boom, the connecting piece includes a first flange on a first end and a second flange on a second end, the first section including a third flange and the second section including a fourth flange, and the first flange being connected to the third flange in a force-fitting manner and the second flange being connected to the fourth flange in a force-fitting manner. Here, the connecting piece is disposed between the two sections.

In other words, a screw connection with the two sections of the limb is supposed to be established on both sides of the connecting piece by means of flange plates. The flanges which are connected to one another are preferably connected by means of screws, a screw connection, in particular a screw nut connection, by means of threaded bars or bolts. All flange plates can be made of metal, in particular steel or stainless steel.

As an alternative, the screws could already be inserted into the connecting piece during the production process so that the additional flange plate could be omitted.

The first flange preferably comprises first webs or projecting regions and the second flange preferably comprises second webs or web regions, the first flange and the second flange each being disposed at or placed or plugged onto the end of the core. In this case, the first and seconds webs of the flanges are also wrapped by the glass fibers in addition to the core. This makes it possible to fix both the first flanges and the second flanges to the core in order to obtain a connecting piece which has flanges on both sides.

The first webs and the second webs can be projecting regions. The first and the second webs can be configured to be placed or plugged onto a shell surface of the core or to be disposed on the shell surface of the core.

Furthermore, a machine, in particular a forest harvester, comprising an articulated boom as described above, is proposed. As a consequence of using the electrically insulating connecting piece, it is possible to let the machine work near power lines or high-voltage power lines without cutting the power supply.

A preferred embodiment of the machine comprises a felling head, wherein the felling head is disposed at the articulated boom, in particular at the second limb.

A manipulator or a device which comprises a gripping device and a felling device can be understood to be a felling head. By means of the gripping device, for instance, a tree or a log can be gripped or held, whereas it is made possible to fell or cut the tree or log by means of the felling device.

The felling device can, for instance, comprise scissors or a cutting tool like a saw. The gripping device can, for instance, comprise a gripper in the shape of a pair of tongs or of a fork.

Moreover, a method for manufacturing a connecting piece for at least one limb of an articulated boom is proposed, comprising the following steps:
 wrapping a core with glass fibers and
 casting the glass fibers with a plastic matrix.

In a preferred embodiment, the method comprises the further step of:
 introducing boreholes into the connecting piece.

Moreover, another method for manufacturing a connecting piece for at least one limb of an articulated boom is proposed, comprising the following steps:
 placing a flange on each end of a core, said flanges including webs,
 wrapping the core and the webs with glass fibers and
 casting the glass fibers with a plastic matrix.

Another preferred embodiment of the method comprises the further step of:
 removing the core.

It is possible to remove the core after having cast the glass fibers with the plastic matrix.

Moreover, a use of an articulated boom for a machine, in particular a forest harvester, comprising a felling head, is proposed, said felling head being disposed at the articulated boom, in particular at the second limb.

A harvester can be understood to be a forest harvester.

Further advantages and advantageous configurations of the subject-matter of the disclosure can be taken from the description, the drawing and the claims.

Exemplary embodiments of the disclosure are illustrated in a schematically simplified way in the drawing and will be explained in more detail in the following description.

Figure 2:
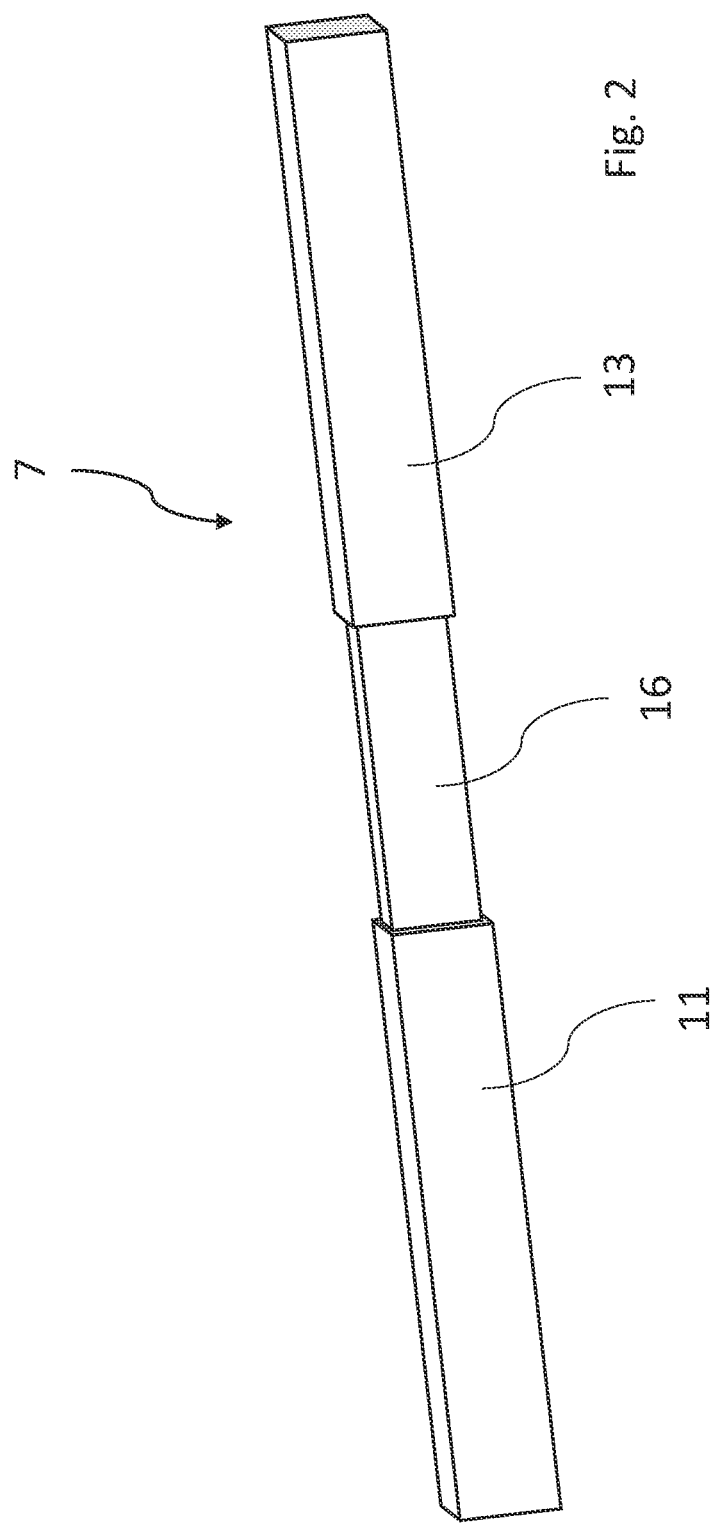
Figure 3:
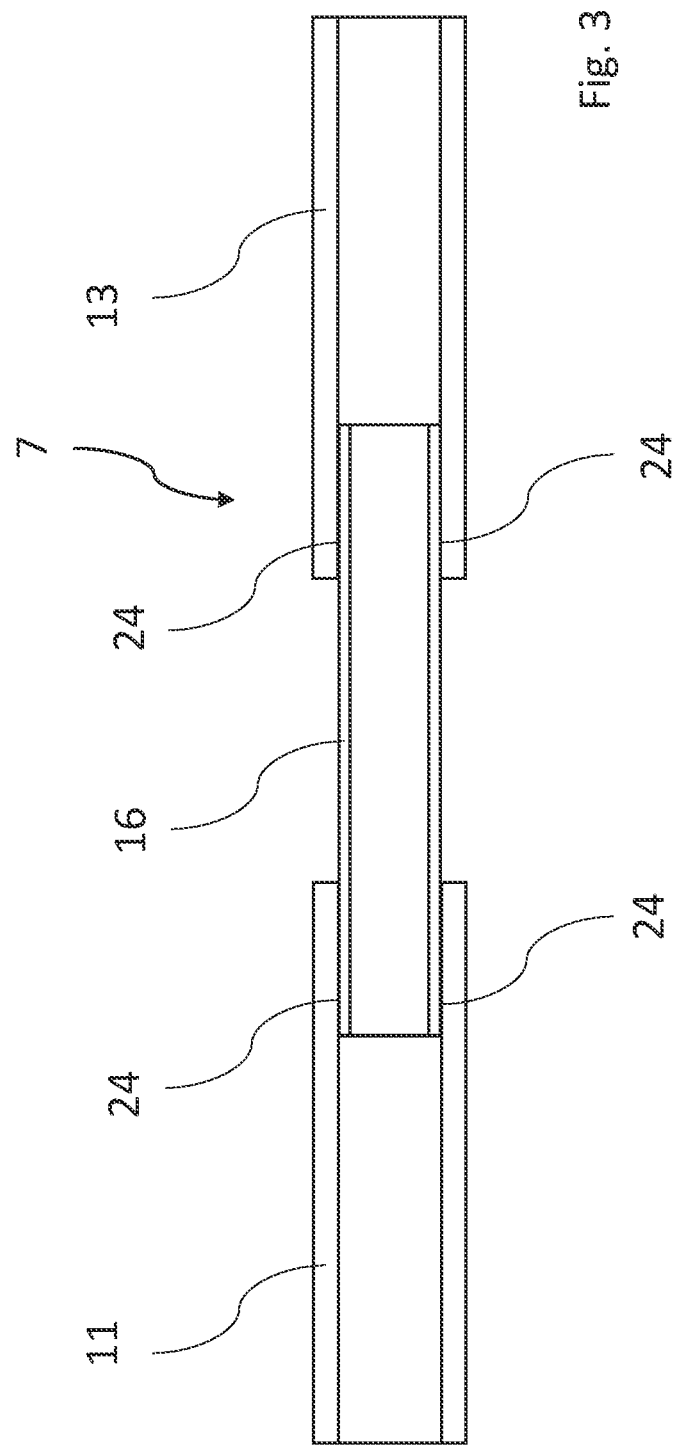
Figure 9:
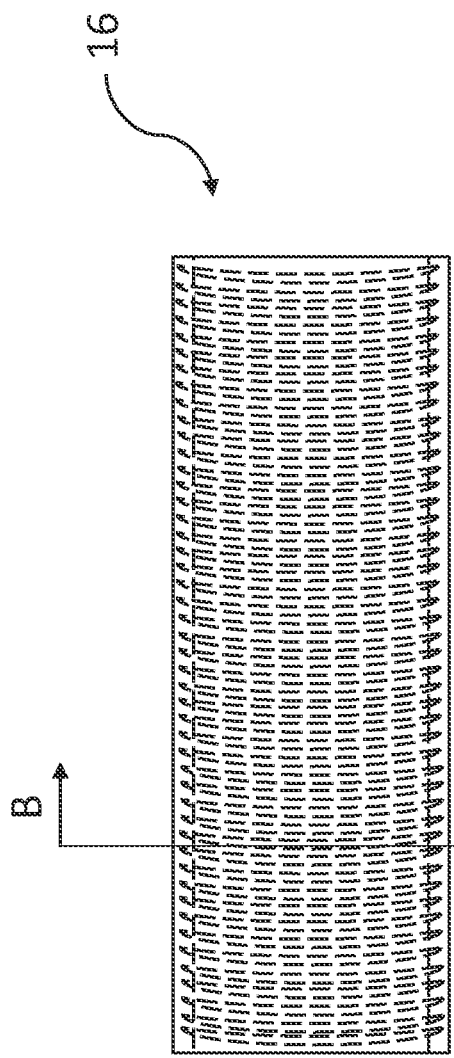
Figure 10:
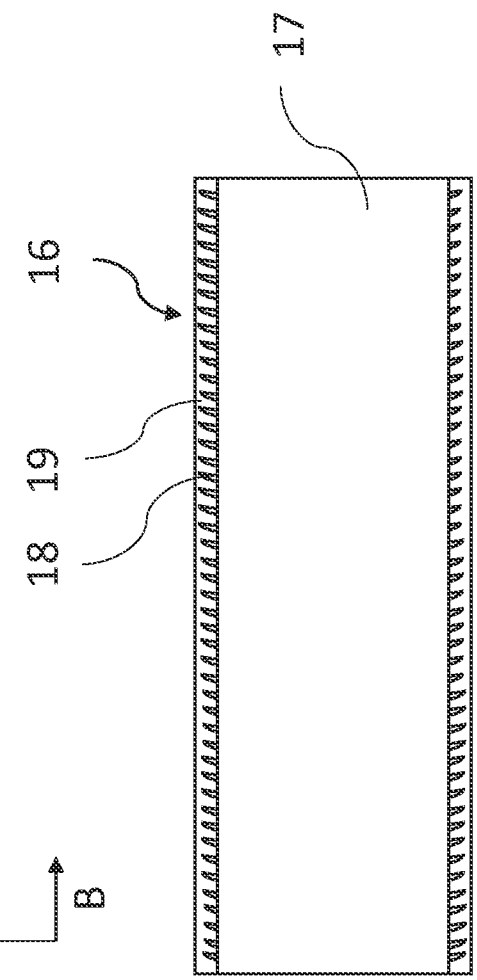
Figure 11:
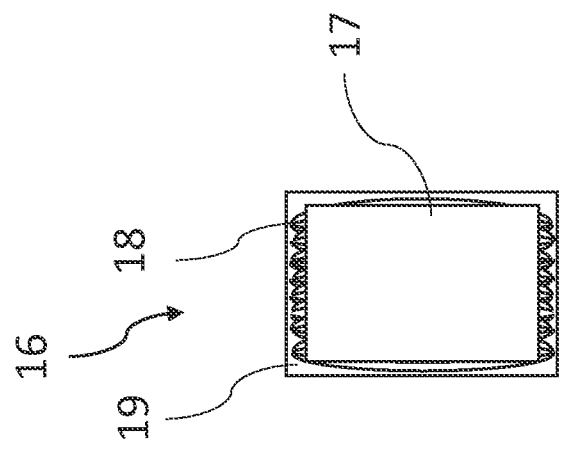

FIG. 1: shows an embodiment of a machine;

FIG. 2: shows a view of a first embodiment of a first limb of an articulated boom of the machine;

FIG. 3: shows a longitudinal section through the first limb of FIG. 2;

FIG. 4: shows a view of a connecting piece of the first limb of FIG. 3;

FIG. 5: shows a longitudinal section through the connecting piece of FIG. 4;

FIG. 6: shows a cross-section A-A of FIG. 4;

FIG. 7: shows a view of a second embodiment of a first limb of an articulated boom of the machine;

FIG. 8: shows a longitudinal section through the first limb of FIG. 7;

FIG. 9: shows a view of a connecting piece of the first limb of FIG. 8;

FIG. 10: shows a longitudinal section through the connecting piece of FIG. 9;

FIG. 11: shows a cross-section B-B of FIG. 10;

FIG. 12: shows a view of another connecting piece;

FIG. 13: shows a view of a third embodiment of a first limb of an articulated boom of the machine;

FIG. 14: shows a longitudinal section through the first limb of FIG. 13;

FIG. 15: shows a view of a connecting piece of the first limb of FIG. 14;

FIG. 16: shows a longitudinal section through the connecting piece of FIG. 15;

FIG. 17: shows a section C-C of FIG. 15;

FIG. 18: shows a view of an alternative connecting piece of FIG. 14;

FIG. 19: shows a longitudinal section through the connecting piece of FIG. 18; and FIG. 20: shows a section D-D of FIG. 18.

FIG. 1 shows a machine 1 in the form of a forest harvester. The machine 1 comprises a superstructure 2, an undercarriage 3, a movable cab 4, an articulated boom 10 and a felling head 30.

The superstructure 2 is rotatably mounted on the undercarriage 3. The operator cab 4 is connected to the superstructure 2 by means of a lifting arm 5. The articulated boom 10 is pivotably connected to the superstructure 2. The articulated boom 10 comprises a first limb 7 and a second limb 8. The first limb 7 is pivotably borne or disposed at the superstructure 2. The second limb 8 is pivotably borne or disposed at the first limb 7. For pivoting the second limb 8 relative to the first limb 7, a lifting and stick cylinder 6 is disposed between the two limbs 7, 8.

Furthermore, the machine comprises a felling head 30 which is disposed at the distal end of the second limb. With the aid of the felling head 30, it is, on the one hand, possible to grip and hold a log, for example by means of a gripping device of the felling head 30, and, on the other hand, possible to cut or fell the log by means of a cutting or shearing device of the felling head 30. The felling head 30 is preferably rotatable or movable in all directions in three-dimensional space.

The limb 7 of the articulated boom 10 shown in FIG. 1 comprises a first section 11 and a second section 13. An electrically insulating connecting piece 16 which connects the two sections 11, 13 is disposed between the first section 11 and the second section 13. Both sections 11, 13 are made of metal, in particular steel.

FIG. 2 shows a first limb 7 of the articulated boom having the connecting piece 16. A first end region of the connecting piece 16 is partially introduced into the first section 11 and a second end region of the connecting piece 16 is partially introduced into the second section 13. The connecting piece 16 is rigidly connected to the first section 11 and the second section 13.

As shown in FIG. 3, the end regions of the connecting piece 16 which are introduced into the first section 11 and second section 13 are glued to the first section 11 and second section 13. A glue or a glued connection 24 is used for this. Two part adhesives on an acrylate or epoxy resin base are suitable as a glue, for example.

FIG. 4 shows the connecting piece 16. Glass fibers and a core which is covered or wrapped by the glass fibers are shown as dashed lines since they are not visible in this view.

FIG. 5 shows a longitudinal section through the connecting piece 16. The connecting piece 16 comprises the core 17 which is wrapped by the glass fibers 18, said glass fibers 18 being cast with a plastic matrix 19. In other words, the glass fibers 18 which are cast with the plastic matrix 19 realize a glass-fiber reinforced plastic (GRP). FIG. 6 shows a section A-A of FIG. 4.

The core 17 can be pulled and thus removed from the connecting piece 16 as required after the core 17 has successfully been wrapped by the glass fibers 18 and after the plastic matrix 19 has subsequently been cast. The core 17 can consist of foam glass, foam glass panels or the like.

FIG. 7 shows an alternative first limb 7 of an articulated boom having the connecting piece 16. A first end region of the connecting piece 16 is partially introduced into the first section 11 and a second end region of the connecting piece 16 is partially introduced into the second section 13. The connecting piece 16 is rigidly connected to the first section 11 and to the second section 13.

As shown in FIG. 8, in contrast to the first limb 7 according to FIG. 2, the end regions which are introduced into the first section 11 and the second section 13 are connected to the first section 11 and the second section 13 using connecting means 25. Screw nut connections or the like are used as connecting means 25.

FIG. 9 shows the connecting piece 16. Glass fibers and a core which is covered or wrapped by the glass fibers are shown in dashed lines since they are not visible in this view.

FIG. 10 shows a longitudinal section through the connecting piece 16. The connecting piece 16 comprises the core 17 which is wrapped by the glass fibers 18, said glass fibers 18 being cast with a plastic matrix 19. In other words, the glass fibers 18 which are cast with the plastic matrix 19 realize a glass-fiber reinforced plastic (GRP). FIG. 11 shows a section B-B of FIG. 10.

The core 17 can be pulled and thus removed from the connecting piece 16 as required after the core 17 has successfully been wrapped by the glass fibers 18 and after the plastic matrix 19 has subsequently been cast. The core 17 can consist of foam glass, foam glass panels or the like.

As shown in FIG. 12, it is possible to insert reinforcing plates or sheets 27, 28 into the connecting piece 16 or to attach them to the connecting piece 16. In this case, the reinforcing plates or sheets 27, 28 can be placed on the glass fibers which are cast by means of the plastic matrix or on the core of the connecting piece before the glass fibers are wrapped around the core. It is possible to guarantee a screwed connection with the help of the shown boreholes 29.

FIG. 13 shows another alternative embodiment of the first limb 7 of an articulated boom. In contrast to the two previous embodiments in accordance with FIG. 2 and FIG. 7, the connecting piece is not slid into the first section 12 and the second section 13.

Instead, a first end of the connecting piece 16 includes a first flange 20 and a second end includes a second flange 22, as shown in FIG. 14. The first section 11 includes a third flange 12 and the second section 13 includes a fourth flange 14. In this case, the first flange 20 is connected to the third flange 12 in a force-fitting manner and the second flange 22 is connected to the fourth flange 14 in a force-fitting manner. Screw nut connections or the like can be used as the connecting means 26. All flanges 12, 14 and 20, 22 are made of metal, in particular steel.

FIG. 15 shows the connecting piece 16. Glass fibers and a core which is covered or wrapped by the glass fibers and webs of the flanges 20, 22 are shown in dashed lines since they are not visible in this view.

As shown in FIG. 16, the first flange 20 comprises first webs 21 and the second flange 22 comprises second webs 23. The first flange 20 and the second flange 22 are each disposed at the ends of the core 17, placed on the ends or plugged onto them. The webs 21, 23 are inserted into an indentation, a clearance or a cavity of the core 17. In addition to the core 17, the webs 21, 23 of the flanges 20, 22 are also wrapped by the glass fibers 18, said glass fibers 18 being cast with a plastic matrix 19. In other words, the glass fibers 18 which are cast with the plastic matrix 19 realize a glass-fiber reinforced plastic (GRP).

FIG. 17 shows a section C-C of FIG. 16. The first flange 20 includes boreholes or openings 27. The boreholes or openings 27 are located at the first flange 20, at the second flange 22 and at the third flange 12 of the first section 11 and at the fourth flange 14 of the second section 13. The connecting means 26 are inserted or can be attached with the help of the boreholes or openings 27.

Structurally, it is not possible to pull the core 17 which can consist of foam glass, foam glass panels or the like.

In contrast to FIGS. 15 to 17, the webs 21, 23 are directly disposed on the shell surface of the core 17 in FIGS. 18 to 20, without there being the need to realize an indentation for the webs 21, 23 in the core 17, as shown in FIG. 19, for example.

As a consequence of the webs 21, 23 and thus the flanges 20, 22 being disposed in this way, it is possible to pull the core 17 out of the connecting piece 16, thus removing it from the connecting piece 16, as required after a successful wrapping with the glass fibers 18 and a subsequent casting with the plastic matrix 19. The core 17 can consist of foam glass, foam glass panels or the like.

A method for manufacturing the connecting piece 16 for the first limb 7 of the articulated boom 10 can comprise the following steps:

wrapping the core 17 with glass fibers 18 and
casting the glass fibers 18 with the plastic matrix 19.

Another method for manufacturing the connecting piece 16 for the first limb 7 of the articulated boom 10 can comprise the following steps:

placing one of the flanges 20, 22 onto the core 17 in each case, said flanges 20, 22 including the webs0 21, 23,
wrapping the core and the webs with the glass fibers 18 and
casting the glass fibers with a plastic matrix 19.

By providing the electrically insulating connecting piece 16, it is possible to carry out works with a machine 1 near power lines or high-voltage power lines without putting the workforce operating the machine in danger and without damaging the machine if the articulated boom of the machine touched the power lines.

LIST OF REFERENCE NUMERALS 1 machine
2 superstructure
3 undercarriage
4 operator cab
5 lifting arm
6 lifting and stick cylinder
10 articulated boom
11 section
12 flange
13 section
14 flange
16 connecting piece
17 core
18 glass fibers
19 matrix
20 flange
21 web
22 flange
23 web
24 glued connection
25 connecting means
26 connecting means
27 reinforcing sheet
28 reinforcing sheet
29 borehole
30 felling head

The invention claimed is:

1. An articulated boom for a machine, having two limbs, wherein at least one of the limbs comprises a first section, a second section and an electrically insulating connecting piece which connects the first section to the second section and which is rigidly connected to the first section and to the second section, said connecting piece comprising glass fibers which are cast with a plastic matrix;
wherein the connecting piece includes a first flange on a first end and a second flange on a second end, the first section including a third flange and the second section including a fourth flange, and the first flange being connected to the third flange in a force-fitting manner and the second flange being connected to the fourth flange in a force-fitting manner.

2. The articulated boom according to claim 1, wherein the connecting piece comprises a core which is wrapped by the glass fibers.

3. The articulated boom according to claim 1, wherein the first flange comprises first webs and the second flange comprises second web, the first flange and the second flange each being disposed at the end of a core which is wrapped by the glass fibers, and the webs of the flanges also being wrapped by the glass fibers in addition to the core.

4. The articulated boom according to claim 1, wherein the plastic matrix comprises thermosetting materials, thermoplastics and/or elastomers.

5. A machine comprising an articulated boom according to claim 1.

6. The machine according to claim 5, further comprising a felling head, wherein the felling head is disposed at the articulated boom.

7. An articulated boom for a machine, having two limbs, wherein at least one of the limbs comprises a first section, a second section and an electrically insulating connecting piece which connects the first section to the second section and which is rigidly connected to the first section and to the second section, said connecting piece comprising glass fibers which are cast with a plastic matrix;
wherein the connecting piece comprises a core which is wrapped by the glass fibers;
wherein the core consists of foam glass and has a gross density in the range of 100 to 165 kg/m$^3$.

8. The articulated boom according to claim 7, wherein the connecting piece includes a first and a second end region, said first end region partially being introduced into the first section and said second end region partially being introduced into the second section.

9. The articulated boom according to claim 7, wherein the end regions of the connecting piece which are introduced into the first section and into the second section respectively are glued to the first section and to the second section respectively.

10. The articulated boom according to claim 7, wherein the end regions of the connecting piece which are introduced into the first section and into the second section respectively are connected to the first section and to the second section using connectors.

11. The articulated boom according to claim 7, wherein the plastic matrix comprises thermosetting materials, thermoplastics and/or elastomers.

12. A machine comprising an articulated boom according to claim 7.

13. The machine according to claim 12, further comprising a felling head, wherein the felling head is disposed at the articulated boom.

* * * * *